(12) United States Patent
Barghoorn et al.

(10) Patent No.: US 6,596,811 B1
(45) Date of Patent: Jul. 22, 2003

(54) THERMOPLASTIC MOLDING MATERIAL EXHIBITING A HIGH PUNCTURING RESISTANCE AND A GOOD ANTISTATIC BEHAVIOR

(75) Inventors: Peter Barghoorn, Kallstadt (DE); Peter Ittemann, Lampertheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/647,094

(22) PCT Filed: Mar. 18, 1999

(86) PCT No.: PCT/EP99/01810
§ 371 (c)(1),
(2), (4) Date: Sep. 26, 2000

(87) PCT Pub. No.: WO99/50348
PCT Pub. Date: Oct. 7, 1999

(30) Foreign Application Priority Data

Mar. 31, 1998 (DE) .......................................... 198 14 423
Apr. 22, 1998 (DE) .......................................... 198 17 993

(51) Int. Cl.⁷ .......................... C08L 25/12; C08L 55/02
(52) U.S. Cl. .............................. 525/63; 525/64; 525/66; 525/69
(58) Field of Search ........................... 523/201; 525/63, 525/64, 65, 66, 69

(56) References Cited

U.S. PATENT DOCUMENTS 4,291,134 A    9/1981    Hambrecht et al. ........... 525/92

FOREIGN PATENT DOCUMENTS

| EP | 018 591 | 11/1980 |
| EP | 127 056 | 12/1984 |
| EP | 127 057 | 12/1984 |
| EP | 135 801 | 4/1985 |
| EP | 576 288 | 12/1993 |

OTHER PUBLICATIONS

Mitulla et al., CAPLUS AN1985:221797 abstracting EP135801 and DE 3331158.*
DERWENT Abstract 85–069460/12 abstracting DE3331158.*
Nikitin, The Chemistry of Cellulose and Wood, p. 62–71 (1966).*
Mandelkern, An Introduction to Macromolecules, p. 19–27, Springer Verlag (1983).*
Hiemenz, Polymer Chemistry, p. 34–43, Marcel Dekker (1984).*
Fried, Polymer Science and Technology, "1.3 Molecular Weight", p. 16–18, Prentice Hall (1995).*

* cited by examiner

Primary Examiner—Jeffrey Mullis
(74) Attorney, Agent, or Firm—Keil & Weinkauf

(57) ABSTRACT

The molding composition comprises components A to C and, if desired, D:

- a: as component A, from 20 to 94% by weight of a hard component made from one or more copolymers of styrene and/or α-methylstyrene with acrylonitrile, where the proportion of acrylonitrile is from 10 to 50% by weight,
- b: from 5 to 70% by weight of at least one graft copolymer B, made from
  - b1: as component B1, from 10 to 90% by weight of at least one elastomeric particulate graft base with a glass transition temperature below 0° C., and
  - b2: as component B2, from 10 to 90% by weight of at least one graft made from a copolymer of styrene and/or α-methylstyrene with acrylonitrile, where the proportion of acrylonitrile is from 10 to 50% by weight,
- c: as component C, from 0.1 to 10% by weight of at least one three-block copolymer of the formula X-Y-X with a central block Y made from propylene oxide units with an average molecular weight in the range from 2000 to 4000 and terminal blocks X made from ethylene oxide units whose average proportion in the three-block copolymer is from 2 to 35% by weight, where the total weight of components A to C is 100% by weight, and

- d: as component D, from 0 to 10% by weight, based on the total weight of components A to C, of other conventional auxiliaries and fillers.

6 Claims, No Drawings

THERMOPLASTIC MOLDING MATERIAL EXHIBITING A HIGH PUNCTURING RESISTANCE AND A GOOD ANTISTATIC BEHAVIOR

The invention relates to thermoplastic molding compositions with high puncture resistance and good antistatic performance. The molding compositions are impact-modified copolymers of styrene and/or α-methylstyrene with acrylonitrile.

Impact-modified styrene-acrylonitrile copolymers are used in a wide variety of applications. They are preferably used for producing moldings which are to have good mechanical properties. It is frequently necessary for molding compositions of this type to be given antistatic properties. This is generally done by adding an antistat to the molding compositions. To ensure sufficient breadth of application for the molding compositions it is desirable to make them suitable for a wide range of working conditions.

FR-B-1 239 902 has disclosed re sins which have been given antistatic properties. Three-block copolymers of the formula X-Y-X can be added, inter alia, to molding compositions having polystyrene units, polyacrylo-nitrile units and polybutadiene units. Y here is a polypropylene oxide block with a molecular weight of from 1000 to 1800 and each X is a polyethylene oxide block. The proportion of polyethylene oxide is from 20 to 80%.

It is known from EP-B 0 018 591 that the abovementioned three-block copolymers of the formula X-Y-X can be added to styrene-acrylonitrile copolymers with no rubber component. The addition increases the internal lubrication of the molding compositions, giving an improvement in processing latitude in injection molding. The molecular weight of the block Y in the three-block copolymer may be from 1200 to 3650, and the proportion of ethylene oxide units is from 10 to 30% by weight.

It is known from EP-A-0 135 801 that the abovementioned three-block copolymers of the formula X-Y-X can be added to polymer blends made from polycarbonate and impact-modified styrene-acrylonitrile copolymer to improve processing latitude. Here, the molecular weight of the polypropylene oxide block Y is, for example, 1200, 2250 or 3600. The proportion of ethylene oxide here is 10 or 40% by weight.

It is an object of the present invention to provide impact-modified copolymers of styrene and/or α-methylstyrene with acrylonitrile which have increased puncture resistance and at the same time good antistatic performance.

We have found that this object is achieved by means of a molding composition made from components A to C and, if desired, D:

a: as component A, from 20 to 94% by weight of a hard component made from one or more copolymers of styrene and/or α-methylstyrene with acrylonitrile, where the proportion of acrylonitrile is from 10 to 50% by weight, b: from 5 to 70% by weight of at least one graft copolymer B, made from b1: as component B1, from 10 to 90% by weight of at least one elastomeric particulate graft base with a glass transition temperature below 0° C., and b2: as component B2, from 10 to 90% by weight of at least one graft made from a copolymer below 0° C., and b2: as component B2, from 10 to 90% by weight of at least one graft made from a copolymer of styrene and/or α-methylstyrene with acrylonitrile, where the proportion of acrylonitrile is from 10 to 50% by weight, c: as component C, from 0.1 to 10% by weight of at least one three-block copolymer of the formula X-Y-X with a central block Y made from propylene oxide units with an average molecular weight in the range from 2000 to 4000 and terminal blocks X made from ethylene oxide units whose average proportion in the three-block copolymer is from 2 to 35% by weight, where the total weight of components A to C is 100% by weight, and d: as component D, from 0 to 10% by weight, based on the total weight of components A to C, of other conventional auxiliaries and fillers.

Molding compositions with components A, B and D and suitable to be given these properties have been described, for example, in DE-A-29 01 576 and in particular in the earlier document DE-A-197 28 629 which, however, was unpublished at the priority date of the present application.

The proportion of component A in the novel molding compositions is preferably from 40 to 84.9% by weight, particularly preferably from 55 to 79.7% by weight. The proportion of component B is preferably from 15 to 50% by weight, particularly preferably from 20 to 40% by weight. The proportion of component C is preferably from 0.1 to 5% by weight, particularly preferably from 0.3 to 2% by weight. The proportion of component D is preferably from 0 to 5% by weight, particularly preferably from 0 to 3% by weight.

The proportion of acrylonitrile in component A is preferably from 10 to 50% by weight, particularly preferably from 15 to 40% by weight, in particular from 18.5 to 36% by weight.

In component B, the proportion of component B1 is preferably from 20 to 80% by weight, particularly preferably from 25 to 75% by weight, and the proportion of component B2 is preferably from 20 to 80% by weight, particularly preferably from 25 to 75% by weight. The proportion of acrylonitrile in component B2 here is preferably from 15 to 40% by weight, particularly preferably from 15 to 35% by weight.

In component C, the average molecular weight of the block Y made from propylene oxide units is preferably from 2200 to 3800, particularly preferably from 2300 to 3500, in particular about 2300, about 2750 or about 3250, in each case +/−10%. The average proportion of the terminal blocks X made from ethylene oxide units, based on component C, is preferably from 3 to 28% by weight, particularly preferably from 8 to 24% by weight, in particular from about 8 to 14% by weight or from about 18 to 24% by weight.

Component A

Component A preferably has a viscosity number VN (determined in accordance with DIN 53726 at 25° C., 0.5% strength by weight in dimethylformamide) of from 50 to 120 ml/g, particularly preferably from 52 to 110 ml/g and in particular from 55 to 105 ml/g. It is particularly preferably a styrene-acrylonitrile copolymer. Copolymers of this type are obtained in a known manner by bulk, solution, suspension, precipitation or emulsion polymerization. Bulk and solution polymerization are preferred. Details of these processes are described, for example, in Kunststoffhandbuch, ed. R. Vieweg and G. Daumiller, vol. V "Polystyrol", Carl-Hanser-Verlag Munich, 1969, pp. 118 ff.

Component B

Component B is a graft copolymer with an elastomeric particulate graft base with a glass transition temperature below 0° C. The graft base here may have been selected from all of the known suitable elastomeric polymers. It is preferably ABS (acrylonitrile-butadiene-styrene) rubber, ASA (acrylo-nitrile-styrene-alkyl acrylate) rubber, EPDM rubber, siloxane rubber or another rubber.

Component B1 is preferably at least one (co)polymer made from b11: as component B11, from 60 to 100% by weight, preferably from 70 to 100% by weight, of at least one conjugated diene, of a $C_1$–$C_{10}$-alkyl acrylate, or of a mixture of these, b12: as component B12, from 0 to 30% by weight, preferably from 0 to 25% by weight, of at least one monoethylenically unsaturated monomer differing from component B11, and b13: as component B13, from 0 to 10% by weight, preferably from 0 to 6% by weight, of at least one crosslinking monomer.

Possible conjugated dienes B11 are in particular butadiene, isoprene, chloroprene and mixtures of these, and also the $C_1$–$C_{10}$-alkyl acrylates listed below and mixtures of these. Preference is given to the use of butadiene or isoprene or mixtures of these, especially butadiene, or of n-butyl acrylate.

The monomers present as component B12 may, if desired, be monomers which vary the mechanical and thermal properties of the core within a particular range. Examples of monoethylenically unsaturated comonomers of this type which may be mentioned are styrene, substituted styrenes, acrylonitrile, methacrylonitrile, acrylic acid, methacrylic acid, dicarboxylic acids, such as maleic acid and fumaric acid, and also anhydrides of these, such as maleic anhydride, nitrogen-functional monomers, such as dimethylaminoethyl acrylate, diethylaminoethyl acrylate, vinylimidazole, vinylpyrrolidone, vinylcaprolactam, vinylcarbazole, vinylaniline and acrylamide, $C_1$–$C_{10}$-alkyl esters of acrylic acid, such as methyl acrylate, ethyl acrylate, n-propyl acrylate, isopropyl acrylate, n-butyl acrylate, isobutyl acrylate, sec-butyl acrylate, tert-butyl acrylate and ethylhexyl acrylate, the corresponding $C_1$–$C_{10}$-alkyl esters of methacrylic acid, and also hydroxyethyl acrylate, aromatic and araliphatic esters of acrylic or methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate, N-substituted maleimides, such as N-methyl-, N-phenyl- and N-cyclohexylmaleimide, and unsaturated ethers, such as vinyl methyl ether, and also mixtures of these.

Preferred components B12 used are styrene, α-methylstyrene, n-butyl acrylate, methyl methacrylate or mixtures of these, in particular styrene and n-butyl acrylate or mixtures of these, especially styrene. If a component B12 is used but no component B13, the proportion of component B11 is preferably from 70 to 99.9% by weight, particularly preferably from 90 to 99% by weight, and the proportion of component B12 is preferably from 0.1 to 30% by weight, particularly preferably from 1 to 10% by weight. Particular preference is given to butadiene-styrene copolymers and n-butyl acrylate-styrene copolymers within the quantity range given.

Examples of crosslinking monomers of component B13 are divinyl compounds, such as divinyl benzene, diallyl compounds, such as diallyl maleate, allyl esters of acrylic and methacrylic acid, dihydrodicyclopentadienyl acrylate (DCPA), divinyl esters of dicarboxylic acids, for example of succinic acid or adipic acid, and diallyl and divinyl ethers of dihydric alcohols, for example of ethylene glycol or of 1,4-butanediol.

The graft B2 is preferably a styrene-acrylonitrile copolymer.

The graft copolymers B are usually prepared by the emulsion polymerization process. This polymerization is generally carried out at from 20 to 100° C., preferably from 30 to 80° C. Conventional emulsifiers are frequently added, for example alkali metal salts of alkyl- or alkylarylsulfonic acids, alkyl sulfates, fatty alcohol sulfonates, salts of higher fatty acids having from 10 to 30 carbon atoms, sulfosuccinates, ether sulfonates or resin soaps. Preference is given to the use of the alkali metal salts, in particular the sodium or potassium salts of alkylsulfonates or fatty acids having from 10 to 18 carbon atoms.

The emulsifiers are generally used in amounts of from 0.5 to 5% by weight, in particular from 0.5 to 3% by weight, based on the monomers used in preparing the graft base.

The amount of water preferably used in preparing the dispersion is such that the finished dispersion has a solids content of from 20' to 50% by weight. The water/monomers ratio usually used is from 2:1 to 0.7:1.

Free-radical generators suitable for initiating the polymerization are any of those which decompose at the selected reaction temperature, i.e. both those which decompose thermally on their own and those which do this in the presence of a redox system. Preferred polymerization initiators are free-radical generators, for example peroxides, such as preferably peroxosulfates (e.g. sodium persulfate or potassium persulfate) and azo compounds, such as azodiisobutyronitrile. However, it is also possible to use redox systems, in particular those based on hydroperoxides, such as cumin hydroperoxide.

The polymerization initiators are generally used in amounts of from 0.1 to 1% by weight, based on the graft base monomers.

Both the free-radical generators and the emulsifiers are added to the reaction mixture, for example batchwise in the form of the entire amount at the beginning of the reaction, or batchwise and divided up into a number of portions at the beginning and at one or more later junctures, or continuously over a particular period of time. The continuous addition may also follow a gradient, which may, for example, rise or fall or be linear or exponential, or may also be stepped (step function).

It is also possible to make concomitant use of molecular weight regulators, such as ethylhexyl thioglycolate, n-dodecyl or tert-dodecyl mercaptan or other mercaptans, terpinols or dimeric methylstyrene, or other compounds suitable for regulating molecular weight. The molecular weight regulators are added to the reaction mixture batchwise or continuously, as described above for the free-radical generators and emulsifiers.

To maintain a constant pH, preferably of from 6 to 9, concomitant use may be made of buffer substances, such as $Na_2HPO_4/NaH_2PO_4$, sodium hydrogen carbonate, or buffers based on citric acid/citrate. Regulators and buffer substances are used in the customary amounts, and further details on this topic are therefore unnecessary.

In a particular embodiment, it is also possible to prepare the graft base by polymerizing the monomers B1 in the presence of a finely divided latex (the seed latex method of polymerization). This latex is the initial charge and may be made from monomers which form elastomeric polymers, or else from other monomers mentioned above. Suitable seed latices are made from, for example, polybutadiene or polystyrene.

In another preferred embodiment, the graft base B1 may be prepared by the feed method. In this process, the polymerization is initiated using a certain proportion of the monomers, and the remainder of the monomers B1 (the "feed portion") is added as feed during the polymerization. The feed parameters (shape of the gradient, amount, duration, etc.) depend on the other polymerization conditions. The principles of the descriptions given in connection with the method of addition of the free-radical initiator and/or emulsifier are once again relevant here.

Graft polymers with a number of "soft" and "hard" shells are also suitable.

The precise polymerization conditions, in particular the type, amount and method of addition of the emulsifier and of the other polymerization auxiliaries, are preferably selected so that the resultant latex of the graft polymer B has an average particle size, defined by the $d_{50}$ of the particle size distribution, of from 80 to 800 nm, preferably from 80 to 600 nm and particularly preferably from 85 to 400 nm.

In one embodiment of the invention, the reaction conditions are adjusted with respect to each other in such a way that the polymer particles have bimodal particle size distribution, i.e. a size distribution with two maxima developed to some extent.

The bimodal particle size distribution is preferably achieved by (partial) agglomeration of the polymer particles. This can be achieved, for example, by the following procedure: the monomers which form the core are polymerized to a conversion of usually at least 90%, preferably more than 95%, based on the monomers used. This conversion is generally achieved after from 4 to 20 hours. The resultant rubber latex has an average particle size $d_{50}$ of not more than 200 nm and a narrow particle size distribution (virtually monodisperse system).

In the second step, the rubber latex is agglomerated. This is generally done by adding a dispersion of an acrylate polymer. Preference is given to the use of dispersions of copolymers of $C_1$–$C_4$-alkyl acrylates, preferably of ethyl acrylate, with from 0.1 to 10% by weight of monomers which form polar polymers, examples being acrylic acid, methacrylic acid, acrylamide or methacrylamide, N-methylolmethacrylamide and N-vinyl-pyrrolidone. Particular preference is given to a copolymer made from 96% of ethyl acrylate and 4% of methacrylamide. The agglomerating dispersion may, if desired, also comprise more than one of the acrylate polymers mentioned.

In general, the concentration of the acrylate polymers in the dispersion used for agglomeration should be from 3 to 40% by weight. For the agglomeration, from 0.2 to 20 parts by weight, preferably from 1 to 5 parts by weight, of the agglomerating dispersion are used for each 100 parts of the rubber latex, the calculation in each case being based on solids. The agglomeration is carried out by adding the agglomerating dispersion to the rubber. The addition rate is usually noncritical, and the addition usually takes from about one to 30 minutes at from 20 to 90° C., preferably from 30 to 75° C.

The rubber latex may also be agglomerated by other agglomerating agents, such as acetic anhydride, as well as by an acrylate polymer. Agglomeration by pressure or freezing is also possible. The methods mentioned are known to the person skilled in the art.

Under the conditions mentioned, only some of the rubber particles are agglomerated, giving a bimodal distribution. More than 50%, preferably from 75 to 95%, of the particles (distribution by number) are generally in the non-agglomerated state after the agglomeration. The resultant partially agglomerated rubber latex is relatively stable, and can therefore easily be stored or transported without coagulation.

To achieve a bimodal particle size distribution of the graft polymer B, it is also possible to prepare, separately from one another in the usual manner, two different graft polymers B' and B" differing in their average particle size, and to mix the graft polymers B' and B" in the desired mixing ratio.

The graft B2 may be prepared under the same conditions as those used for preparing the graft base B1, and may be prepared in one or more steps. In two-stage grafting, for example, it is possible initially to polymerize styrene and/or α-methylstyrene alone, and then styrene and acrylonitrile, in two steps in succession. This two-stage grafting (firstly styrene, then styrene plus acrylonitrile) is a preferred embodiment. Further details concerning preparation of the graft polymers B are given in DE-A 12 60 135 and DE-A 31 49 358, and also in EP-A-0 735 063.

It is advantageous in turn to carry out the graft polymerization onto the graft base B1 in an aqueous emulsion. It may be undertaken in the same system as that used for polymerizing the graft base, and further emulsifier and initiator may be added. These do not have to be identical with the emulsifiers and/or initiators used for preparing the graft base B1. For example, it may be expedient to use a persulfate as initiator for preparing the graft base B1 but a redox initiator system for polymerizing the graft shell B2. Otherwise, that which was said for the preparation of the graft base B1 is applicable to the selection of emulsifier, initiator and polymerization auxiliaries. The monomer mixture to be grafted on may be added to the reaction mixture all at once, in portions in more than one step or, preferably, continuously during the polymerization.

If non-grafted polymers are produced from the monomers B2 during the grafting of the graft base B1, the amounts, which are generally less than 10% by weight of B2, are attributed to the weight of component B.

Component C

The three-block copolymer of the formula X-Y-X used according to the invention may be prepared in a manner known per se (N. Schbnfeldt, Grenzflachenaktive Ethylenoxid-Addukte, Wissenschaftliche Verlagsgesellschaft mbH, Stuttgart, 1976, pp. 53 ff.) by polymerization, firstly preparing central polypropylene oxide block Y, to both ends of which is added a block made from ethylene oxide units. The molecular weights given above are generally average molecular weights (number average $M_n$, for example determined from the OH number in accordance with DIN 53240).

Preferred three-block copolymers and their preparation are also described in EP-A-0 135 801 and EP-A-0 018 591.

Component D

Other customary auxiliaries and fillers may be used as component D. Examples of substances of this type are lubricants and mold-release agents, waxes, pigments, dyes, flame retardants, antioxidants, stabilizers to protect against the effect of light, fibrous or pulverulent fillers, fibrous or pulverulent reinforcing agents, and antistats, and also other additives, or mixtures of these.

Examples of suitable lubricants and mold-release agents are stearic acids, stearyl alcohol, stearates and stearamides, and also silicone oils, montan waxes and waxes based on polyethylene and polypropylene.

Examples of pigments are titanium dioxide, phthalocyanines, ultramarine blue, iron oxides and carbon black, and also the entire class of organic pigments.

For the purposes of the invention, dyes are any of the dyes which can be used for transparent, semitransparent or nontransparent coloration of polymers, in particular those which are suitable for coloring styrene copolymers. Dyes of this type are known to the person skilled in the art.

Examples of flame retardants which may be used are the halogen-containing or phosphorus-containing compounds known to the person skilled in the art, magnesium hydroxide, and other common compounds or mixtures of these. Red phosphorus is also suitable.

Particularly suitable antioxidants are sterically hindered mononuclear or polynuclear phenolic antioxidants, which may have various substituents or be bridged via substituents. These include, besides monomeric compounds, oligomeric compounds which can be built up from a number of fundamental phenol units. Other possible compounds are hydroquinones and hydroquinone analogs and substituted compounds, and also antioxidants based on tocopherols and on derivatives of these. It is also possible to use mixtures of different antioxidants. In principle it is possible to use any of the compounds which are commercially available or suitable for styrene copolymers, for example Topanol® or Irganox®.

Together with the phenolic antioxidants given as examples above, concomitant use may be made of costabilizers, in particular those containing phosphorus or containing sulfur. P- or S-containing costabilizers of this type are known to the person skilled in the art and are available commercially.

Examples of suitable stabilizers to protect against the effect of light are various substituted resorcinols, salicylates, benzotriazoles, benzophenones and HALS (hindered amine light stabilizers), available commercially for example as Tinuvin®.

Examples which may be mentioned as fibrous or pulverulent fillers are carbon fibers or glass fibers in the form of glass fabrics, glass mats or glass filament rovings, chopped glass, glass beads, and also wollastonite, particularly preferably glass fibers. If glass fibers are used, these may have been provided with a size and a coupling agent to improve compatibility with the components of the blend. The glass fibers may be incorporated either as short glass fibers or as continuous-filament strands (rovings).

Suitable particulate fillers are carbon black, amorphous silica, magnesium carbonate, chalk, powdered quartz, micas, bentonites, talc, feldspar, or, in particular, calcium silicates, such as wollastonite, or kaolin.

Each of the individual additives is used in the usual amounts, and therefore no further details on this topic are required.

Preparation of the Molding Compositions

The molding compositions are preferably prepared by separate preparation of the individual components A to C and, if desired, D, and then mixing the components.

Processes suitable for preparing the molding compositions are described, for example, in EP-A-0 135 801, EP-B-0 018 591 and, in particular, DE-A-197 28 628.

The novel molding compositions may be used for producing moldings, fibers or films. Processes of this type for producing moldings, fibers and films are listed in the publications mentioned.

The invention is described in greater detail below, using examples.

EXAMPLES

1. Preparation of the Graft Polymer B
1.1 Preparation of the Graft Base B1
43,120 g of the monomer mixture given in Table 1 are polymerized at 65° C. in the presence of 432 g of tert-dodecyl mercaptan (TDM), 311 g of the potassium salt of $C_{12}$–$C_{20}$ fatty acids, 82 g of potassium persulfate, 147 g of sodium hydrogencarbonate and 58,400 g of water, to give a polybutadiene latex. The details of the process are described in EP-A-0 062 901, Ex. 1, p. 9, line 20 to p. 10, line 6. The conversion was 95% or greater. The average particle size $d_{50}$ of the latex was from 80 to 120 nm.

To agglomerate the latex, 35,000 g of the resultant latex were agglomerated at 65° C. by adding 2700 g of a dispersion (solids content 10% by weight) made from 96% by weight of ethyl acrylate and 4% by weight of methacrylamide (partial agglomeration).

For use of an n-butyl acrylate polymer as graft base B1 the procedure used is as in EP-A-0 735 063, Comparative Examples 1, 2, 14 and 15.
1.2 Preparation of the Graft B2

9000 g of water, 130 g of the potassium salt of $C_{12}$–$C_{20}$ fatty acids and 17 g of potassium peroxodisulfate were added to the agglomerated latex. The monomer mixtures given in Table 2 were then added, with stirring, at 75° C. within a period of 4 hours. Conversion, based on the graft monomers was virtually quantitative.

The resultant graft polymer dispersion with bimodal particle size distribution had an average particle size $d_{50}$ of from 150 to 350 nm and a $d_{90}$ of from 400 to 600 nm. The particle size distribution had a first maximum in the range from 50 to 150 nm and a second maximum in the range from 200 to 600 nm.

The resultant dispersion was mixed with an aqueous dispersion of an antioxidant then coagulated by adding a magnesium sulfate solution. The coagulated rubber was centrifuged off from the dispersion water, and washed with water. This gives a rubber with about 30% by weight of residual water adhering to or enclosed within the product.

TABLE 1

| | Graft base B1 | |
|---|---|---|
| Example | R1 | R2 |
| Monomers [% by weight] | | |
| Butadiene | 100 | 0 |
| Crosslinking agent | 0 | 2 |
| n-Butyl acrylate | 0 | 98 |
| Properties: | | |
| Swelling index | 32 | |
| Gel content [%] | 70 | |

R2 was obtained in accordance with DE-A-31 49 358.

TABLE 2

| | Graft B2 and finished graft polymer B | | |
|---|---|---|---|
| Component | Ba | Bb | Bc |
| Graft base from Example | R1 | R2 | R1 |
| Monomers [% by weight] | | | |
| Styrene | 80 | 75 | 70 |
| Acrylonitrile | 20 | 25 | 30 |

2. Preparation of the Polymers A

The thermoplastic polymers A were prepared by the continuous solution polymerization process as described in Kunststoff Handbuch, ed. R. Vieweg and G. Daumiller, Vol. V "Polystyrol", Carl-Hanser-Verlag, Munich, 1969, pp. 122–124. Table 3 gives the formulations and properties.

TABLE 3

| Components | Components | | |
|---|---|---|---|
| | Aa | Ab | Ac |
| Monomers [% by weight] | | | |
| Styrene | 76 | 75 | 67 |
| Acrylonitrile | 24 | 25 | 33 |
| Viscosity number VN [ml/g] | 67 | 80 | 60 |

3. Preparation of the Blends Made From Components A and B

Blending After Graft Rubber B had Been Dried

The graft rubber B comprising residual water was dried in vacuo using warm air and intimately mixed with the other component A in a Werner & Pfleiderer ZSK 30 extruder at 250° C. and 250 min$^{-1}$, with a throughput of 10 kg/h. The molding composition was extruded and the molten polymer mixture was subjected to rapid cooling by passing into a water bath at 30° C. The solidified molding composition was pelletized.

4. Tests Carried Out

Swelling index of graft base B1: a film was produced by evaporating the water from the aqueous dispersion of the graft base. 0.2 g of this film were mixed with 50 g of toluene. After 24 hours the toluene was removed from the swollen specimen under reduced pressure and the specimen was weighed. The specimen was weighed again after 16 hours' drying in vacuo at 110° C. The values calculated were:

$$\text{Swelling index } SI = \frac{\text{Weight of the swollen specimen after removal of solvent at reduced pressure}}{\text{Weight of the specimen dried in vacuo}}$$

$$\text{Gel content} = \frac{\text{Weight of the specimen dried in vacuo}}{\text{Initial weight of specimen before swelling}} \cdot 100\%$$

Particle Sizes in the Rubber Latex:

The average particle size d given is the weight-average particle size as determined using an analytical ultracentrifuge and the method of W. Scholtan and H. Lange, Kolloid-Z. and Z.-Polymere 250 (1972), pp. 782–796. The ultracentrifuge measurement gives the integral weight distribution of particle diameter in a specimen. From this it can be seen what percentage by weight of the particles have a diameter smaller than or equal to a particular size. The $d_{10}$ is a particle diameter selected in such a way that the diameters of 10% by weight of all of the particles are smaller, and those of 90% by weight are larger. The reverse applies to the $d_{90}$ : 90% by weight of all of the particles have smaller diameters, and 10% by weight larger diameters, than the $d_{90}$. The weight-average particle diameter $d_{50}$ and the volume-average particle diameter $d_{50}$ are particle diameters selected in such a way that the particle diameters of, respectively, 50% by weight and 50% by volume of all of the particles are larger and those of, respectively, 50% by weight and 50% by volume are smaller. $d_{10}$, $d_{50}$ and $d_{90}$ describe the breadth Q of the particle size distribution, where $Q=(d_{90}-d_{10})/d_{50}$. The smaller is Q, the narrower is the distribution.

Viscosity number VN: this was determined in accordance with DIN 53726 on a 0.5% strength by weight solution of the polymer in dimethylformamide.

To determine the mechanical and antistatic values below, test specimens were injection molded from pellets of the molding compositions. The specimens were standard small specimens (see DIN 53453), dumb-bell specimens, disks of diameter 60 mm and thickness 2 mm and rectangular sheets of thickness 2 mm. In each case the melt temperature was 250° C. and the mold temperature 60° C., unless otherwise stated.

Vicat: the Vicat heat distortion temperature was determined on pressed sheets in accordance with ISO 306/B with a load of 50 N and a heating rate of 50 K/h.

$w_p$: the penetration energy $w_p$ was determined in accordance with ISO 6603-2 on disks or rectangular sheets of 40×40 mm, using the Plastechon test at 23° C. The test specimens had been produced at a melt temperature of 250° C.

Antistatic Performance:
1.) Dust chamber test: the dust in a dust chamber is whirled for 10 sec. Any large amounts of dirt adhering are removed by blowing, and a visual assessment is made of the dust coating.
2.) On disks (diameter 60 mm, thickness 2 mm) using the corona method (based on DIN VDE 0303 T.3). E (15), the residual charge present after 15 min is taken as a measure of the effectiveness of the antistat.

Example 1c (Comparative)

A mixture of 66% by weight of component Aa and 34% by weight of component Ba was extruded (Werner & Pfleiderer ZSK 30) at 250° C., the heat distortion temperature was determined and antistatic performance was tested in the dust chamber. The results are listed in Table 4.

Examples 2c to 8c, 9 and 10

A mixture of 66% by weight of component Aa and 34% by weight of component Ba was extruded (Werner & Pfleiderer ZSK 30) at 250° C. with the antistats given in Table 4, the heat distortion temperature was determined and antistatic performance was tested in the dust chamber. The results are listed in Table 4.

Example 11c (Comparative)

A mixture of 71% by weight of component Ab and 29% by weight of component Ba was extruded (Werner & Pfleiderer ZSK 30) at 250° C., the heat distortion temperature was determined and the corona test was used to test antistatic performance. Puncture performance was also tested. The results are listed in Table 5.

Examples 12c and 13 to 15

A mixture of 71% by weight of component Ab and 29% by weight of component Ba was extruded (Werner & Pfleiderer ZSK 30) at 250° C. with the antistats given in Table 5, the heat distortion temperature was determined and the corona test was used to test antistatic performance. Puncture performance was also tested. The results are listed in Table 5.

As can be seen from the examples, neither ethylene oxide homopolymers nor propylene oxide homopolymers are effective. Only EO/PO three-block copolymers with a PO block of from 2000 to 4000 and an EO fraction below 30% by weight are effective as antistat and mechanical property enhancer.

Examples 16c, 17 and 18

A mixture of 71% by weight of Ac and 29% by weight of Bc was extruded at 250° C. with the antistats given in Table 6, and the dust chamber test was used to determine antistatic performance. Puncture performance was also tested.

TABLE 4

| Molding composition from Example | % by weight of auxiliary | EO fraction (% by weight) | PO fraction (% by weight) | MW of PO block | Total molecular weight (number average) | Heat distortion temperature (° C.) | Dust coat formation |
|---|---|---|---|---|---|---|---|
| 1c |   |   |   |   |   | 96 | pronounced |
| 2c | 1 | 100 |   |   | 600 | 92.1 | pronounced |
| 3c | 1 | 100 |   |   | 1500 | 93.9 | pronounced |
| 4c | 1 |   | 100 | 600 |   | 93.4 | pronounced |
| 5c | 1 |   | 100 | 2000 |   | 94.5 | moderate to pronounced |
| 6c | 1 |   | 100 | 4000 |   | 94.5 | pronounced |
| 7c | 1 | 10 | 90 | 1750 |   | 92.8 | pronounced |
| 8c | 1 | 30 | 70 | 3250 |   | 93.4 | pronounced |
| 9 | 1 | 10 | 90 | 2300 |   | 95.4 | moderate |
| 10 | 1 | 10 | 90 | 3250 |   | 95.4 | weak to moderate |

TABLE 5

| Molding composition from Example | % by weight of auxiliary | EO fraction (% by weight) | PO fraction (% by weight) | MW of PO block | Penetration (Nm) | Heat distortion temperature (° C.) | E (15) (%) |
|---|---|---|---|---|---|---|---|
| 11c |   |   |   |   | 16 | 97.1 | 23 |
| 12c | 1 | 80 | 20 | 1750 | 29.5 | 94.9 | 22 |
| 13 | 1 | 10 | 90 | 2300 | 29.6 | 96.4 | 56 |
| 14 | 1 | 20 | 80 | 2750 | 26.3 | 94.9 | 50 |
| 15 | 1 | 10 | 90 | 3250 | 28.5 | 96.6 | 44 |

TABLE 6

| Molding composition from Example | % by weight of auxiliary | EO fraction (% by weight) | PO fraction (% by weight) | MW of PO block | Penetration (Nm) | Dust coat formation |
|---|---|---|---|---|---|---|
| 16c | — |   |   |   | 19.3 | Pronounced |
| 17 | 0.7 | 10 | 90 | 2300 | 44.1 | moderate |
| 18 | 0.9 | 10 | 90 | 2300 | 42.0 | moderate-weak |

We claim:

1. A molding composition A consisting of components A to C and, optionally, D:
   a: as component A, from 20 to 94% by weight of a hard component consisting of one or more copolymers of styrene and/or α-methylstyrene with acrylonitrile, where the proportion of acrylonitrile is from 10 to 50 by weight,
   b: from 5 to 70% by weight of at least one graft copolymer B, consisting of
      b1: as component B1, from 10 to 90% by weight of at least one elastomeric particulate graft base with a glass transition temperature below 0° C., and
      b2: as component B2, from 10 to 90% by weight of at least one graft moiety grafted to the graft base B1, said graft moiety consisting of a copolymer of styrene and/or α-methylstyrene with acrylonitrile, where the proportion of acrylonitrile is from 10 to 50% by weight,
   c: as component C, from 0.1 to 10% by weight of at least one three-block copolymer of the formula X-Y-X with a central block Y consisting of propylene oxide units with a number average molecular weight in the range from 2000 to 4000 and terminal blocks X consisting of ethylene oxide units whose average proportion in the three-block copolymer is from 2 to 28% by weight, where the total weight of components A to C is 100% by weight, and d: as component D, from 0 to 10% by weight, based on the total weight of components A to C, of other conventional auxiliaries and fillers different from components A to C, selected from the group consisting of lubricants and mold-release agents, waxes, pigments, dyes, flame retardants, antioxidants, stabilizers to protect against the effect of light, fibrous or pulverulent fillers, fibrous or pulverulent reinforcing agents, antistats, and mixtures thereof.

2. A molding composition as claimed in claim 1, wherein component A is a styrene-acrylonitrile copolymer.

3. A molding composition as claimed in claim 1, wherein component B1 is at least one (co)polymer consisting of
   b11: as component B11, from 60 to 100% by weight of at least one conjugated diene, of a $C_1$–$C_{10}$-alkyl acrylate, or of a mixture of these, b12: as component B12, from 0 to 30% by weight of at least one monoethylenically unsaturated monomer differing from component B11, and b13: as component B13, from 0 to 10% by weight of at least one crosslinking monomer.

4. A molding composition as claimed in claim 1, wherein, in component C, the number average molecular weight of the block Y is from 2200 to 3400 and the average proportion of blocks X in the three-block copolymer is from 5 to 25% by weight.

5. A process for preparing a molding composition as claimed in claim 1, by separate preparation of the individual components A to C and, optionally, D, and then mixing the components.

6. A molding, a fiber or a film consisting of a molding composition as claimed in claim 1.

* * * * *